July 29, 1958     B. W. MOGOLIS     2,844,877
GAUGE TOOL
Filed Aug. 10, 1956     2 Sheets-Sheet 1
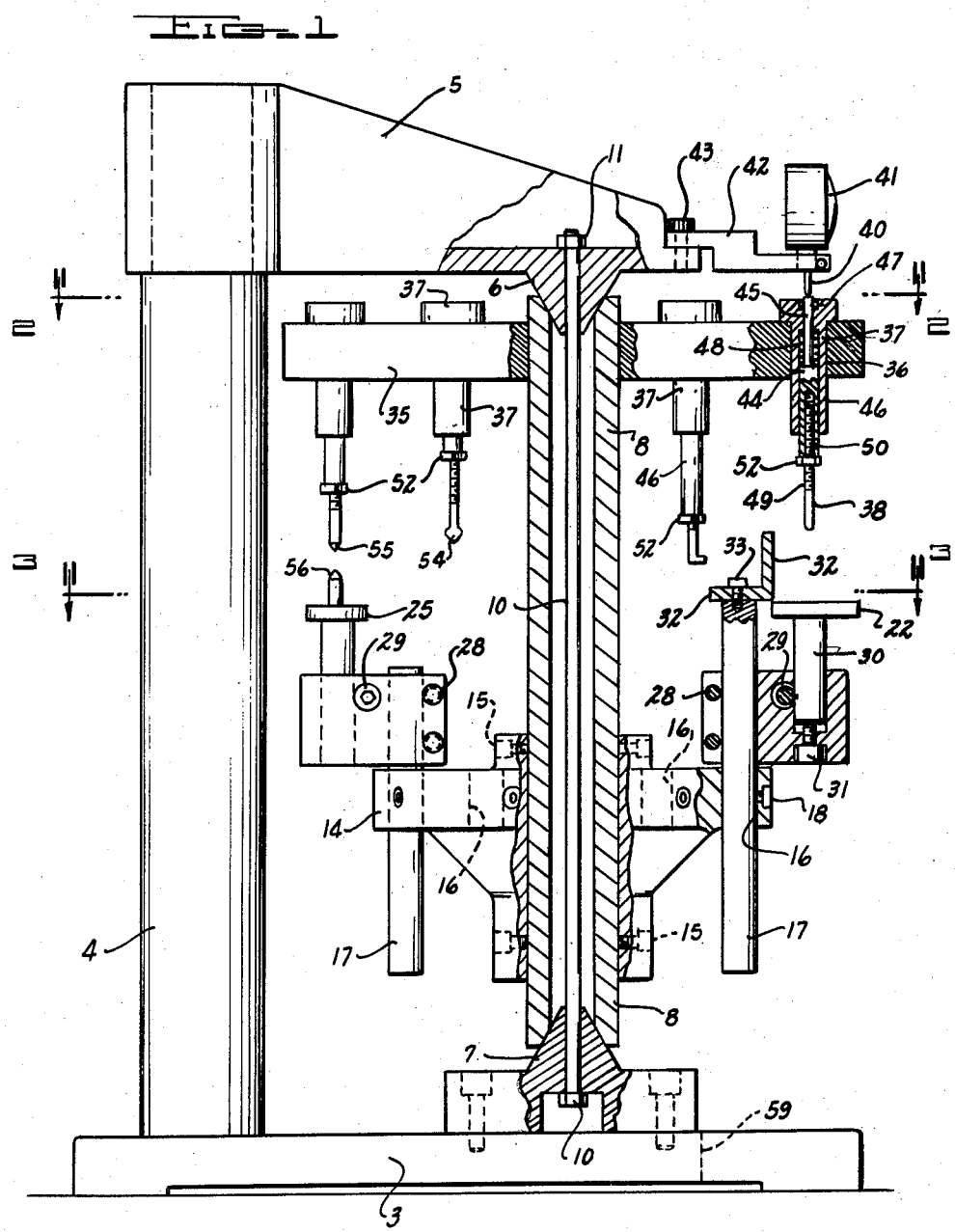
INVENTOR
BRUCE W. MOGOLIS
BY SMITH, OLSEN, LEWIS & McRAE
ATTORNEYS July 29, 1958     B. W. MOGOLIS     2,844,877
GAUGE TOOL
Filed Aug. 10, 1956     2 Sheets-Sheet 2
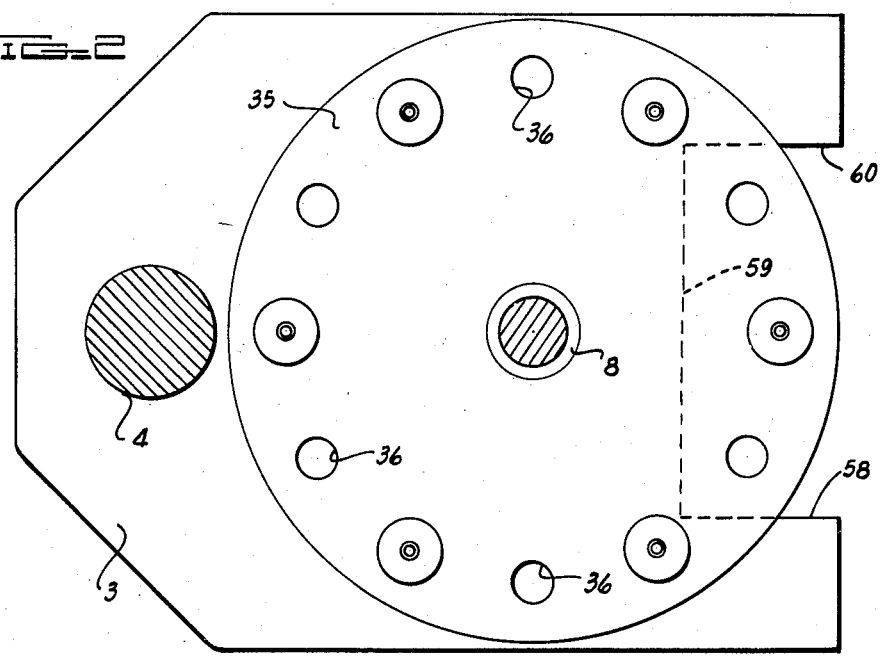
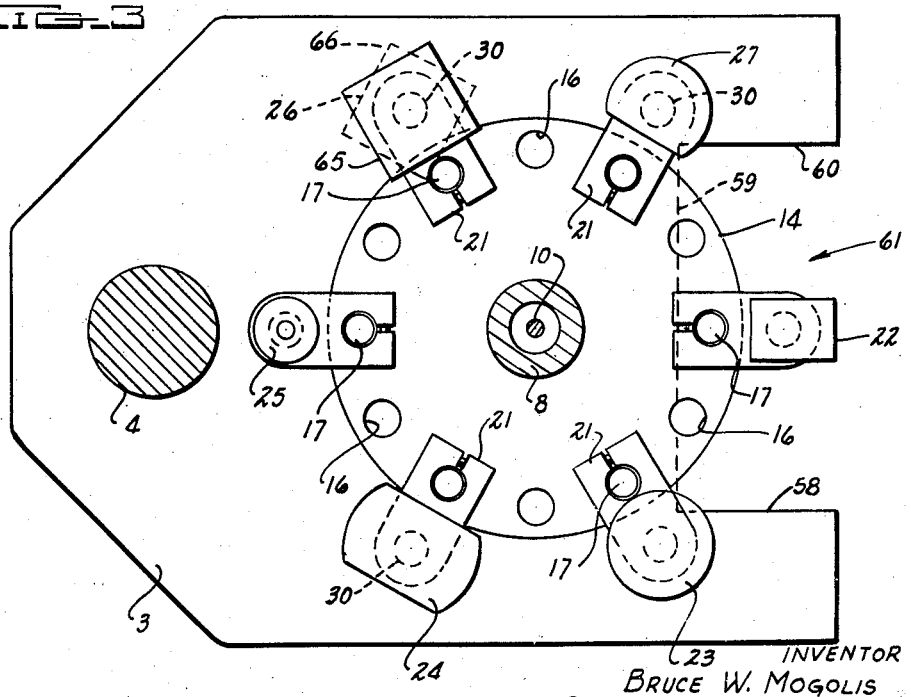
INVENTOR
BRUCE W. MOGOLIS
BY SMITH, OLSEN, LEWIS & McRAE
ATTORNEYS

United States Patent Office 2,844,877
Patented July 29, 1958

2,844,877

GAUGE TOOL

Bruce W. Mogolis, Dearborn, Mich.

Application August 10, 1956, Serial No. 603,272

15 Claims. (Cl. 33—147)

This invention relates to a gage tool operable to measure various different dimensions of work pieces without removal and replacement of the work-engaging members employed in the tool.

Objects of the invention are singly and collectively to provide a gage tool wherein:

(1) Different work piece dimensions may be successively measured without removal and replacement of the necessary work-engaging members, even when the work pieces are of such irregular and changing contour as to require differently contoured work-engaging members for successive dimension-measuring operations, (2) Work pieces of greater dimension than the overall tool dimension may be measured without removal of the work-engaging members, and with the employment of only one external surface plate.

Other objects of this invention will appear in the following description and appended claims, reference being had to the accompanying drawings forming a part of this specification wherein like reference characters designate corresponding parts in the several views.

In the drawings:

Fig. 1 is an elevational view with parts in section of one embodiment of the invention.

Fig. 2 is a sectional view on line 2—2 in Fig. 1.

Fig. 3 is a sectional view on line 3—3 in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a gage tool comprising a horizontal base 3 and a fixed standard 4 which fixedly carries a horizontal arm 5. Conical bearings 6 and 7 fixedly project from arm 5 and base 3 so as to mount hollow shaft 8 for rotary movement. An elongated bolt 10 extends through shaft 8, and a nut 11 is threaded onto bolt 10 so as to adjust the frictional drag of bearings 6 and 7 on shaft 8; it being appreciated that when nut 11 is tightened down on bolt 10 the outer end of arm 5 will be depressed enough to draw bearings 6 and 7 slightly toward one another so as to increase the frictional drag on shaft 8.

Shaft 8 carries a support member or table 14 which is held in vertically adjusted positions by set screws 15. Table 14 is provided with a series of vertical bores 16, each of which slidably receives a shaft 17. Suitable set screws 18 are provided for holding the various shafts 17 in vertically adjusted positions in bores 16.

Each of shafts 17 projects upwardly through a split arm 21 which carries a work-positioning anvil (indicated by numerals 22 through 27 in the drawings). Screws 28 serve to releasably lock each arm 21 on its shaft 17, and cam type lock means 29 is provided for locking the anvil-supporting shaft 30 in vertically adjusted positions with respect to arm 21. A screw 31 is provided for adjusting the position of the anvil shaft prior to its being locked by mechanism 29. Certain of the anvils may be provided with work-locating fixtures, as for example the fixture shown at 32 in Fig. 1. Fixture 32 is held adjacent the anvil by a screw 33 passing through the fixture and into shaft 17.

Shaft 8 fixedly carries a circular support member 35 which is provided with a series of vertical bores 36. Each of bores 36 is adapted to fixedly receive a bushing 37. Bushing 37 supports a work-engaging member 38 for slidable movement toward and away from the deflectable stem 40 of conventional dial indicator means 41. The dial indicator means is suitably carried by arm 5 through the mechanism of a relatively short arm 42. A screw 43 holds arm 42 in position on arm 5.

Work-engaging member 38 includes a member 44 having a reduced portion 45 and an internally threaded portion 46. A nut 47 is threaded onto reduced portion 45 to prevent member 44 from dropping out of bushing 37, and a compression spring 48 encircles portion 45 so as to urge member 44 toward the subjacent anvil accordingly as the work (not shown) or nut 47 will permit. Member 38 also includes a shaft 49 having a threaded portion 50 in mesh with portion 46 of member 44. The effective length of member 38 (i. e. the distance from the upper end of member 44 to the lower end of member 49) may be varied by adjusting nut 52 up or down on portion 50 and turning member 49 in and out of sleeve portion 46.

It will be noted that the various anvils 22 through 27 are contoured differently from one another, the purpose being to provide different anvil surfaces in accordance with different work piece configurations. Also, the lower ends of the various work-engaging members are contoured differently from one another to accommodate different work piece configurations and permit measurement of different work piece characteristics. It is contemplated that various different measuring operations can be carried out with the illustrated apparatus, as for example thread check measurements, gear pitch measurements (see work-engaging surface 54), neck measurements (see configuration of surfaces 55 and 56), out of round measurements (requiring an anvil having a V-shaped cavity), eccentricity measurements, and depth of groove measurements. The anvils and work-engaging members 38 are suitably contoured to permit these and other measuring operations.

In operation of the apparatus the spacing between each anvil and its immediately superjacent work-engaging member 38 is calibrated with a test piece having the desired work piece dimension. Calibration of the various anvil-member 38 spaces is suitably effected by adjusting members 14, 17, 30 and/or 49 until a zero deflection is obtained on dial 41, it being appreciated that members 14 and 35 are manually rotated about the axis of shaft 8 to successively position the various aligned work-engaging elements beneath stem 40 for obtaining the desired readings on dial 41. The adjustment of member 14 on shaft 8 serves as a coarse adjustment for quickly putting the various anvils at the approximate desired spacing from members 38 in accordance with the general dimensions of the various work pieces which it is desired to measure. The adjustment of arm 21 on shaft 17 may be utilized to locate the anvil in desired position adjacent the locating fixture 32 and also to position the anvil with respect to member 38.

After calibration of the various anvil-member 38 spacings the various work pieces are placed on the anvils and the measuring operations are carried out by noting the deflection on dial 41. Different work piece dimensions and work piece configurations are accommodated by suitable rotation of members 14 and 35, it being noted at this point that rotation of both members 14 and 35 is necessary to enable all of the previously indicated measuring operations to be accurately performed; i. e. a construction wherein only one of members 14 and 35 was rotatable could not accommodate the variously contoured work pieces to the same extent as the illustrated construction.

In some cases it is desirable that the anvil be capable of rotational adjustment around a point within itself, and in the illustrated apparatus this desired rotatability is accomplished by shaft construction 30. As can be seen in Fig. 3 shaft 30 and its anvil can be rotated as a unit to put the anvil in full line position 65 or dotted line position 66.

For measuring work piece dimension greater than the spacing between members 14 and 35 the right end portion of base 3 is cut away as at 58, 59 and 60 to form a free space 61. A surface plate (not shown) may be positioned in free space 61 and the anvil turned through one hundred eighty radial degrees around the axis of its shaft 17 so as to put the anvil within the axial silhouette of member 14 and provide uninterrupted communication between the surface plate and the immediately superjacent work-engaging member 38.

I claim:

1. A gage tool comprising two parallel, aligned support members; means mounting said support members for rotary movement about the same axis; dial indicator means fixedly positioned adjacent one of said support members; a plurality of work-engaging members movably mounted in said one support member for selective alignment with the dial indicator means in accordance with the rotated position of said one support member; a plurality of work-positioning anvils mounted on the other support member in alignment with the work-engaging members and dial indicator means in accordance with the rotated position of said other support member; at least two of said work-engaging members having differently dimensioned work-engaging surfaces and at least two of the anvils having differently contoured work-engaging surfaces; whereby selection in the measuring process is available, both as to the work dimension and work configuration, without replacing the work-engaging members or anvils on the support members.

2. A gage tool comprising two parallel, aligned support members; means mounting said support members for rotary movement about the same axis; dial indicator means fixedly positioned adjacent one of said support members; a plurality of work-engaging members movably mounted in said one support member for selective alignment with the dial indicator means in accordance with the rotated position of said one support member; a plurality of work-positioning anvils mounted on the other support member in alignment with the work-engaging members and dial indicator means in accordance with the rotated position of said other support member; at least two of said work-engaging members having differently dimensioned work-engaging surfaces, and each of the anvils having its work-engaging surface positioned at a different distance from the plane of said other support member; whereby selection in the measuring process is available, both as to the work dimension and work configuration, without replacing the work-engaging members or anvils on the support members.

3. A gage tool comprising two parallel, aligned support members; means mounting said support members for rotary movement about the same axis; dial indicator means fixedly positioned adjacent one of said support members; a plurality of work-engaging members movably mounted in said one support member for selective alignment with the dial indicator means in accordance with the rotated position of said one support member; a plurality of work-positioning anvils mounted on the other support member in alignment with the work-engaging members and dial indicator means in accordance with the rotated position of said other support member; each of said work-engaging members having a differently dimensioned work-engaging surface; and means between each of the anvils and said other support member for adjustably positioning the anvils at varying distances from the plane of said other support member; whereby selection in the measuring process is available, both as to the work dimension and work configuration, without replacing the work-engaging members or anvils on the support members.

4. The combination of claim 3 and further including means for independently rotating each of the anvils with respect to said other supporting member on an axis parallel with the dial indicator means axis but out of registry with the respective anvil whereby to provide a free space adjacent said other supporting member for the accommodation of work having a dimension greater than the spacing between the support members.

5. The combination of claim 4 wherein the adjustable positioning means includes a shaft extending through said other support member for axial movement; and the anvil rotating means comprises an arm extending from the anvil around one end of said shaft for rotary movement, there being manually actuable means for releasably locking said arm in fixed positions on said shaft.

6. A gage tool comprising dial indicator means; a work-engaging member movably mounted for actuation of the dial indicator means; a support member mounted for rotary movement about its central axis in a plane at right angles to the direction of movement of the work-engaging member; said support member having a lesser radius than the spacing between its central axis and the work-engaging member, whereby said support member is out of registry with the axis of said work-engaging member; and a plurality of work-positioning anvils, each mounted on the support member for independent movement into and out of registry with the axis of said work-engaging member; whereby work of lesser dimension than the spacing between the anvils and work-engaging member may be accommodated when the anvil is in its axis-registering position, and whereby work of greater dimension than the spacing between the anvils and work-engaging member may be accommodated when the anvil is out of its axis-registering position.

7. A gage tool comprising dial indicator means; a work-engaging member movably mounted for actuation of the dial indicator means; a support member mounted for rotary movement about its central axis in a plane at right angles to the direction of movement of the work-engaging member; said support member having a lesser radius than the spacing between its central axis and the work-engaging member, whereby said support member is out of registry with the axis of said work-engaging member; and a plurality of work-positioning anvils, each mounted on the support member for independent movement from a retracted position within the axial silhouette of the work-supporting member to an extended position in registry with the axis of the work-engaging member; whereby work of lesser dimension than the spacing between the anvils and the work-engaging member may be accommodated when the respective anvil is in its extended position, and whereby work of greater dimension than the spacing between the anvils and the work-engaging member may be accommodated when the anvil is in its retracted position.

8. A gage tool comprising dial indicator means; a work-engaging member movably mounted for actuation of the dial indicator means; a support member mounted for rotary movement about its central axis in a plane at right angles to the direction of movement of the work-engaging member; said support member having a lesser radius than the spacing between its central axis and the work-engaging member, whereby said support member is out of registry with the axis of said work-engaging member; a plurality of shafts mounted in said support member for axial adjusting movements in directions parallel to the support member central axis; a work-positioning anvil carried by each of said shafts with the work-engaging surface of each anvil being located out of registry with its shaft; whereby each of the anvils may be selectively located with its work-engaging surface within the axial silhouette of the work-supporting member or in a position in registry with the axis of the work-engaging member.

9. A gage tool comprising a base; a standard projecting upwardly from said base; an arm projecting horizontally from said standard; a vertical shaft having its opposite ends rotatably mounted in said base and arm, respectively; two horizontal support members centrally carried by said shaft; dial indicator means carried by said arm; a plurality of work-engaging members movably mounted in the upper support member for selective alignment with the dial indicator means in accordance with the rotated position of said upper support member; the distance from the outer limits of the lower support member to the shaft axis being less than the distance from the work-engaging members to the shaft axis; a plurality of anvils movably mounted on the lower support member for independent inward movements from positions in registry with the directly superjacent work-engaging member to positions closer to the shaft axis than the work-engaging members; the portion of the base directly beneath the dial indicator means being cut away to accommodate work of greater dimension than the spacing between the two support members.

10. A gage tool comprising a base; a standard projecting upwardly from said base; an arm projecting horizontally from said standard; aligned bearings mounted in said arm and base; a vertical shaft having its opposite ends rotatably mounted on said bearings; dial indicator means carried by said arm; at least one support member carried by the shaft; a plurality of work-contacting members mounted on the support member for selective alignment with the dial indicator means in accordance with the rotated position of the support member; and adjustable tension means for drawing the two bearings toward one another so as to adjust the frictional drag of the bearings on the shaft.

11. The combination of claim 10 wherein the tension means includes a bolt extending axially through the bearings and shaft, and a nut threaded onto one end of the bolt.

12. The combination of claim 10 wherein the shaft ends are hollow and the bearings are conical, said conical bearings having their smaller ends extending into the hollow ends of the shaft.

13. A gage tool comprising two parallel, aligned support members; means mounting said support members for rotary movement about the same axis; dial indicator means fixedly positioned adjacent one of said support members; a plurality of work-engaging members movably mounted in said one support member for selective alignment with the dial indicator means in accordance with the rotated position of said one support member; a plurality of work-positioning anvils mounted on the other support member in alignment with the work-engaging members and dial indicator means in accordance with the rotated position of said other support member; and means for rotating at least one of the anvils about an axis within itself.

14. A gage tool comprising two parallel, aligned support members; means mounting said support members for rotary movement about the same axis; dial indicator means fixedly positioned adjacent one of said support members; a plurality of work-engaging members movably mounted in said one support member for selective alignment with the dial indicator means in accordance with the rotated position of said one support member; a plurality of work-positioning anvils mounted on the other support member in alignment with the work-engaging members and dial indicator means in accordance with the rotated position of said other support member; the anvil mounting means comprising a first shaft mounted for axial movement in the other support member, an arm carried by said first shaft, and a second anvil-carrying shaft mounted for axial and rotary movement in the arm.

15. The combination of claim 14 wherein a work-locating fixture is mounted on one end of the first shaft for correctly locating the work on the anvil.

References Cited in the file of this patent

UNITED STATES PATENTS 2,499,418     Rinaldy ---------------- Mar. 7, 1950

FOREIGN PATENTS 369,503     Germany -------------- Feb. 20, 1923